Dec. 5, 1939.   W. H. SELLEW   2,182,098
DUPLEX SOLUTION THERMO-COMPRESSION PROCESS
Filed Sept. 29, 1934   5 Sheets-Sheet 2

INVENTOR
William H. Sellew
BY
Synnestvedt & Lechner
ATTORNEYS

Dec. 5, 1939.  W. H. SELLEW  2,182,098
DUPLEX SOLUTION THERMO-COMPRESSION PROCESS
Filed Sept. 29, 1934    5 Sheets—Sheet 3

Dec. 5, 1939.   W. H. SELLEW   2,182,098
DUPLEX SOLUTION THERMO-COMPRESSION PROCESS
Filed Sept. 29, 1934   5 Sheets—Sheet 5

Patented Dec. 5, 1939

2,182,098

UNITED STATES PATENT OFFICE

2,182,098

DUPLEX SOLUTION THERMO-COMPRESSION PROCESS

William H. Sellew, Ann Arbor, Mich., assignor, by mesne assignments, to P. R. Mallory & Co., Inc., New York, N. Y., a corporation of Delaware Application September 29, 1934, Serial No. 746,045

11 Claims. (Cl. 62—179)

My invention relates to methods of elevating the temperature of heat, as contained in relatively low pressure vapor by means of producing a higher pressure vapor, or by means of direct liberation of heat at a temperature higher than that at which it was absorbed, or of producing a higher pressure vapor from relatively low pressure vapor.

The primary objects of the present invention are to provide new, economical and flexible means of increasing the temperature of heat energy, of utilizing at lower temperatures the availability of high temperature heat, of increasing the pressure of the vapor by the use of heat energy, of developing power from heat energy, and of storing available energy which may be used for any desired purpose, and to obtain these objects in a manner which avoids the expensive complications of losses inherent in mechanical systems as well as the limitations in compression ratio and economy inherent in the vapor jet, and to extend the temperature range, the convenience and flexibility of solution thermo-compressors employing a single solution.

In the use of solutions for the purpose of thermo-compression or power generation the temperature range over which the cycle may be operated is frequently limited by the properties of the solution used in the cycle. This limitation may be overcome and the temperature range of the cycle increased by using different solvents, and/or solutes in different steps in the cycle. This principle of duplexing covered by my invention may be used not only to extend the temperature range covered by the cycle but to obtain greater convenience or efficiency in the cycle or operation.

The particular advantages obtained by the use of duplexing two solutions as described herein, are in extending the temperature range to lower and/or to higher temperatures than can be practically obtained by the use of a single solution, which may be limited at the low temperature range by a high freezing point, or at the high temperature range by an extremely high pressure, or low decomposition temperature. By duplexing two different solutions, a wider temperature range and greater thermal efficiency is made possible and the character of the solutions used for any particular temperature range may be specifically adapted to that temperature range without consideration as to the characteristics required of the solution operating at other temperature ranges in the cycle.

I am well aware that two working fluids have been employed in a heat power cycle in order to extend the temperature limits of the cycle. One of the most interesting examples of such operations is the use of a mercury boiler which absorbs heat by isothermal vaporization at temperatures in the neighborhood of 900° F., the mercury vapor then passing through a mercury turbine or prime mover and the residual energy in the low temperature mercury vapor given up to a water boiler which in turn generates steam to be used in the conventional steam turbine or prime mover. Such a method of operation must not be confused with my invention which uses as working fluids neither pure mercury, pure water, or any other single component working substance, or mixture which forms vapor of the same composition as liquid, but solutions which have a lower vapor pressure than that of liquefied volatile component at the same temperature. For that reason it is not necessary to put the high temperature vapor such as mercury through a prime mover in order to convert its potential or available energy into useful work, as by means of my invention this potential energy in the high temperature vapor may be converted to available or potential energy in steam or other working substance at a lower temperature.

Preferred embodiments of the invention are illustrated in the accompanying drawings, wherein—

Figure 1 shows my duplex thermo-compression process using two solutions with both solutes and solvents different.

Figure 2 shows my duplex thermo-compression process using two solutions with the principal parts so arranged for storage, or transmission of the second solution at substantially atmospheric or ground temperature without appreciable loss. Figure 2 also shows the application of my duplex thermo-compression process to heating, refrigeration or air conditioning operations as conducted at a distance from the central concentrating station by means of the second solution.

Figure 1:
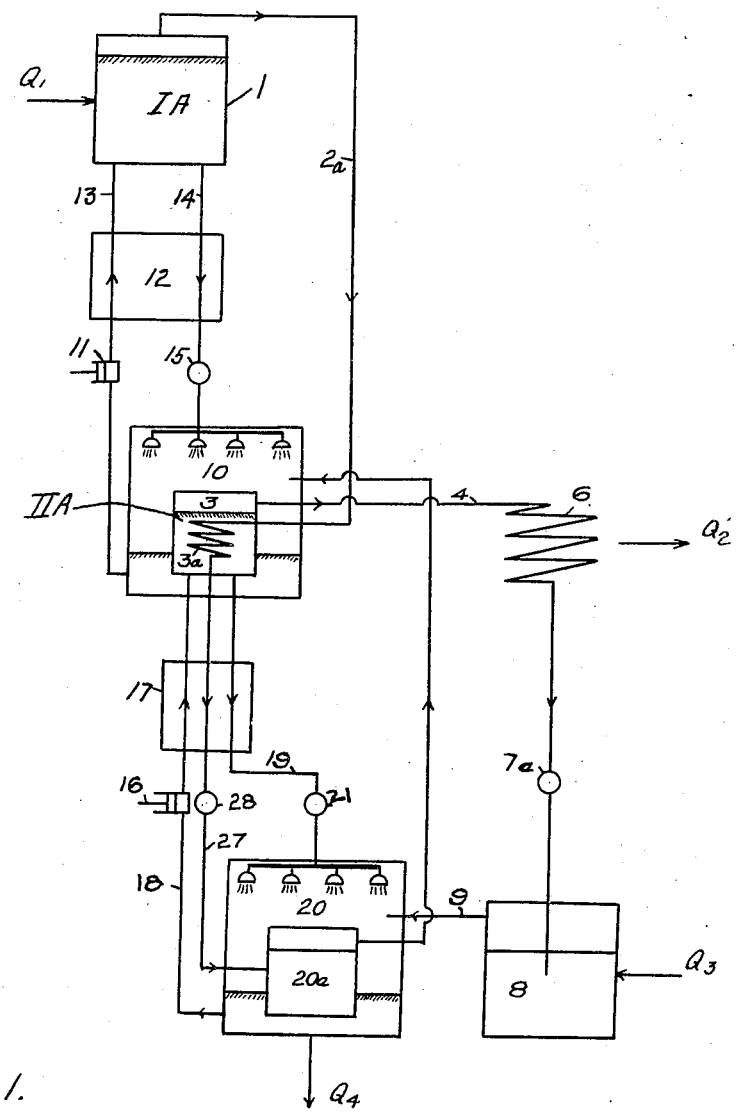

In Figure 1 a simple duplex solution thermo-compression process is shown in which two different solvents are employed in two different solutions, and in which the vapors given off from the high temperature concentrator are not used in the working end of the cycle, only one vapor being used to accomplish the useful purpose of the operation. In a process such as disclosed in Figure 1 a solution IA might be an aqueous solution of caustic potash which boils in concentrator 1 at a high temperature. The solvent vapor such as water vapor or steam from this effect passes through line 2a to the coil 3a in the second concentrator or stripper 3 in which solvent IIA such as ammonia is used with a solute such as water. The vapor condensed in coil 3a due to the lower temperature existing in the concentrator 3 flows through line 27 and countercurrent heat exchanger 17 through the pressure reducing means 28 into the vaporizer 20a in absorber 20. The heat absorbed by the liquid in vaporizer 20a produces solvent vapors at a pressure equal to or greater than that of the solvent in the solution in absorber 10. The solvent vapors IA are therefore absorbed in absorber 10 with the liberation of the heat of condensation and dilution which is given up to concentrator 3 because of the thermal contact between absorber 10 and concentrator 3. The dilute solution IA formed in absorber 10 is pumped by pump 11 through the countercurrent heat exchanger 12 and the pipe 13 and the concentrated solution IA formed in concentrator 1 flows through line 14 the countercurrent heat exchanger 12 and pressure reducing means 15. It is noted that the solvent vapor IA (such as water) given off from concentrator 1 and flowing through coil 3a and vaporizer 20a and back to concentrator 1 by means of absorber 10 operates in a closed cycle and that all the direct useful effect is obtained from the solvent vapors leaving concentrator 3.

In the second vaporizer, 3, the second solvent IIA (such as ammonia) is vaporized or stripped from the solution by the heat of condensation of the solvent vapor IA in coil 3a and the heat transmitted from absorber 10 to stripper 3. This solvent vapor may be used in any useful operation. In Figure 1 it is shown as condensed in condenser 6 with the removal of the heat quantity $Q_2$ to cooling water or atmospheric air and flows through the pressure reducing means 7a into the vaporizer or heat absorber 8 where the pure solvent is vaporized with the absorption of the heat quantity $Q_3$ at a low temperature and flows through line 9 to absorber 20 where the heat of condensation and dilution is given up partially or totally to the boiling solvent in vaporizer 20a and/or as $Q_4$ to cooling water or atmospheric air or utilized to accomplish some desired purpose.

The solution IIA rich in solvent is circulated by means of pump 16 through the countercurrent heat exchanger 17 and the line 18 to concentrator 3 and the concentrated (lean in solvent) solution IIA flows through line 19, the countercurrent heat exchanger 17 and the pressure reducing means 21 to absorber 20.

It is clear that the high pressure, high temperature solvent vapor leaving concentrator 3 through line 4 may be used for the generation of power, heating, evaporation or for any other useful purpose as well as refrigeration as indicated in Figure 1, and that other solutions than those suggested above may be used in more or less stages of concentration and/or absorption. Such a cycle using mercury amalgam as solution IA in the high temperature closed cycle represented by concentrator 1, line 2a, coil 3a, line 27, vaporizer 20a, absorber 10, and lines 13 and 14 could use mercury as a solvent at moderate pressures and higher temperatures in concentrator 1 than could be employed with pure mercury, and the available energy delivered to a solution of a different solvent such as water by means of my duplexing process, making it unnecessary to use mercury turbines or prime movers to recover the available energy in the high temperature heat energy supplied as $Q_1$, as by means of my duplexing process the available energy may be delivered in the form of a vapor from concentrator 3 in such form as to be far more convenient for use in power, heating, refrigeration or other useful operations than the first solvent (such as mercury) that must be employed to obtain the advantages of extremely high temperature of heat input to the cycle.

Figure 2:
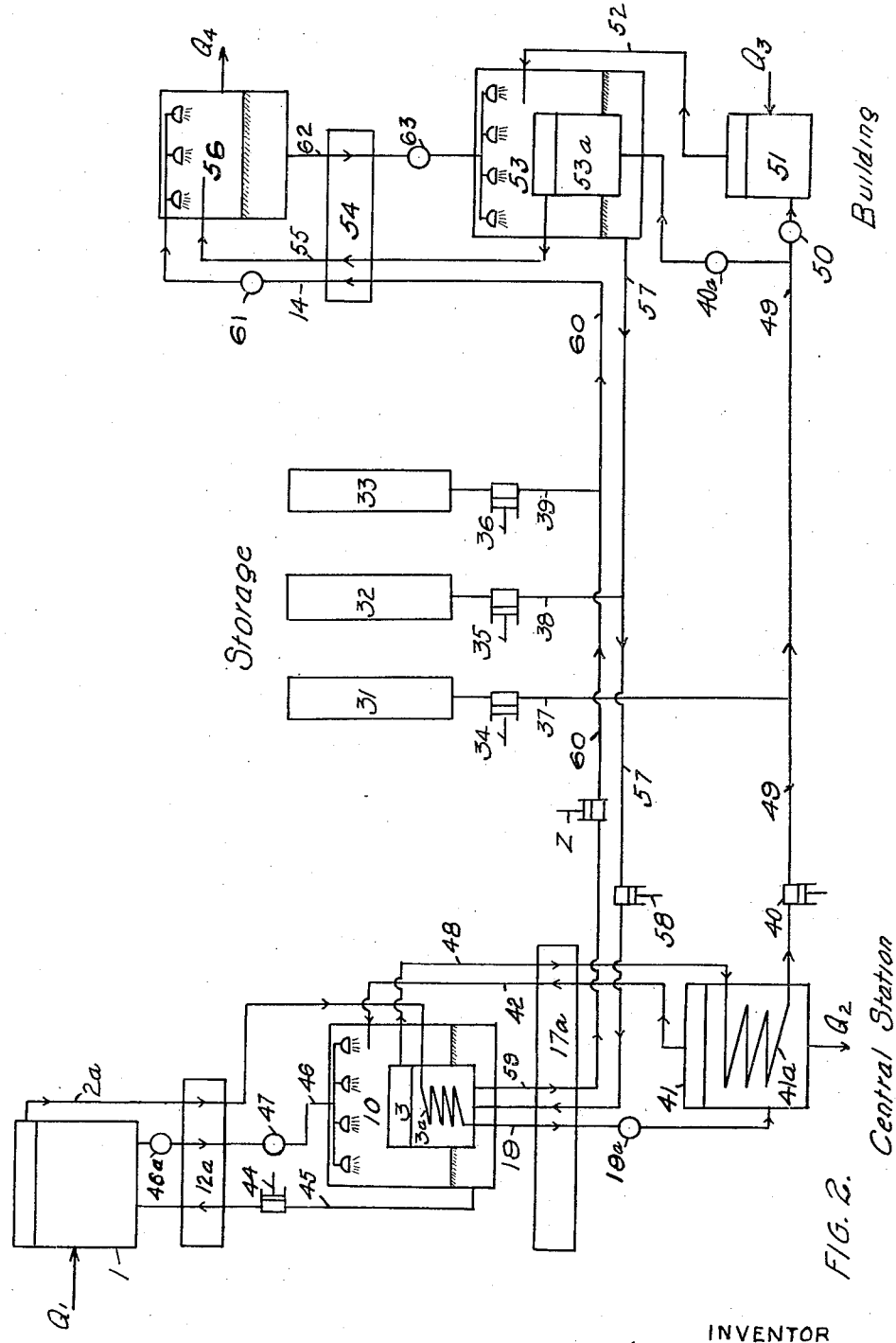

As an example of the application of my duplexing process to solution cycles to extend the range and usefulness of such operations, Figure 2 shows the duplexing of two solutions in a central or concentrating station as a means of extending the range of temperatures that may be used in applying thermo-compression processes to heating of buildings, refrigeration operation, or other similar processes such as the generation of power in which thermo-compression may be used.

The operation of such a duplexing process is apparent from the diagram (Figure 2). Heat energy in any form is supplied to concentrator 1 as $Q_1$. The volatile solvent leaves the concentrator 1 through pipe line 2a giving up its superheat in the heat exchanger 12a and condensing to liquid solvent in coil 3a the heat of condensation being absorbed by the solution in 3. The condensed solvent is cooled in passing through pipe line 18 through countercurrent heat exchanger 17a and flows through the pressure reducing means 18a into vessel 41 where it is vaporized by the heat given off by condensation of the second solvent from vessel 3 in coil 41a. The vapor of the first solvent formed in vessel 41 passes through the countercurrent heat exchanger 17a by means of pipe line 42 and is absorbed in absorber 10 which is placed in thermal contact with concentrator 3, so that the heat of condensation and solution of the first solvent vapor into the solution in absorber 10 is made available to the concentrator 3 for the purpose of concentrating the second solution in vessel 3. The diluted solution from vessel 10 is circulated by pump 44 through line 45 and the countercurrent heat exchanger 12a to concentrator 1, and the concentrated solution from vessel 1 flows through pipe line 46 (valve 46a being open or omitted for this method of operation), the countercurrent heat exchanger 12a and the pressure reducing means 47 into absorber 10. This completes the circuit of the first solution and the first solvent which thus operates in a closed system without commingling with the second solution which is used to extend the temperature range of the cycle to lower temperatures than could be conveniently used with the first solution alone.

For example, the practical limit to the low temperature that might be used with any solution using water as a refrigerant is about 35° F. because of the freezing point of the solvent water which is 32° F. By duplexing an aqueous caustic or saline solution with an ammonia-water solution in the manner described by my duplexing process as shown in Figure 2, this limitation is overcome and the low temperature range is extended to the limit set by the use of ammonia as a refrigerant which is well below 0° F.

In such an operation the solution in concentrator 1 boils and the water vapor condensing in coil 3a supplies heat to the solution in concentrator or stripper 3 at a temperature comparable to that which must be used for original heat input to the cycle if my duplexing process were not used. The vapor given off from the stripper 3 passes through pipe line 48 through the countercurrent heat exchanger 17a and is condensed in coil 41a at a temperature of about 40° F. to 80° F. so as to be at approximately the temperature of the atmosphere or ground in order that it may be transported through pipe line 49 without loss of energy. This condensed liquid flows in part through the pressure reducing means 50 into the vaporizer 51 absorbing heat quantity $Q_3$ at a temperature which may be below 0° F. and may be absorbed from the atmosphere or from refrigerating devices for space cooling or air conditioning. The vapor formed by the absorption of this heat in vaporizer 51 passes through line 52 into absorber 53 where the vapor is absorbed into a solution with the evolution of heat at a higher temperature than that which was absorbed as $Q_3$ in vaporizer 51. This heat evolved by the absorption of ammonia vapor in an aqueous solution in absorber 53 serves to vaporize liquid ammonia in vaporizer 53a. The ammonia vapor so formed in vaporizer 53a is under a higher pressure than the ammonia vapor formed in vaporizer 51 and after passing through countercurrent heat exchanger 54 through pipe line 55 is absorbed in water, or a solution lean in ammonia, forming an aqueous solution in absorber 56, the heat of condensation and solution of the ammonia in the water being available as $Q_4$ at a temperature suitable for useful heating, cooking, steam generation, hot water heating, power generation, etc., or given off to the atmosphere or other cooling medium as may be desired.

The aqueous solution of ammonia leaving absorber 53 at a temperature approximately equal to that of the atmosphere, or of the ground flows through pipe line 57 by means of circulating pump 58 and after flowing through the counter current heat exchanger 17a enters the stripper 3 at a temperature approximately equal to that in the stripper where the vapor such as ammonia is stripped from the water, the vapor passing through the vapor line 48 in the manner already described, and the solution stripped of ammonia (lean in ammonia) passing through pipe line 59, the countercurrent heat exchanger 17a whereby it is cooled to approximately the desired temperature which may equal that of the atmosphere or the ground, through the pipe line 60, circulating means Z, the countercurrent heat exchanger 54 and a pressure reducing means such as 61 into absorber 56. After absorbing some vapor (ammonia) in vessel 56 this solution passes through line 62, the counter-current heat exchanger 54, the pressure-reducing means 63 into the lower stage of absorption in vessel 53, thereby completing the cycle of the second solution and solvent which is entirely independent of any direct contact with the first solution.

By this process which makes available liquid solute or solution lean in solvent, and liquid solvent or solution lean in solute, in pipe lines 60 and 49 respectively at the temperature of the atmosphere or surroundings, and a solution of intermediate composition in pipe line 57 also at the temperature of the atmosphere or the earth, it is possible to store liquid solvent in tank 31, liquid solute in tank 33, and liquid solution in tank 32 without loss in energy or potential work, so that the rate at which solute and solvent are consumed by the vaporizers and absorbers in the building may be greater or less than the rate at which solvent and solute are supplied by the concentrator in the central station. By this means it is possible to operate the concentrating station under the most efficient conditions of constant load during the 24 hours and to handle the peak loads and slack loads during the various periods of the day by circulating additional quantities of solvent and solute from tanks 31 and 33 taking up the proportional excess of solution into tank 32, or to supply solution from tank 32 to the concentrating station storing liquid solvent and solute in tanks 31 and 33.

Figure 4:
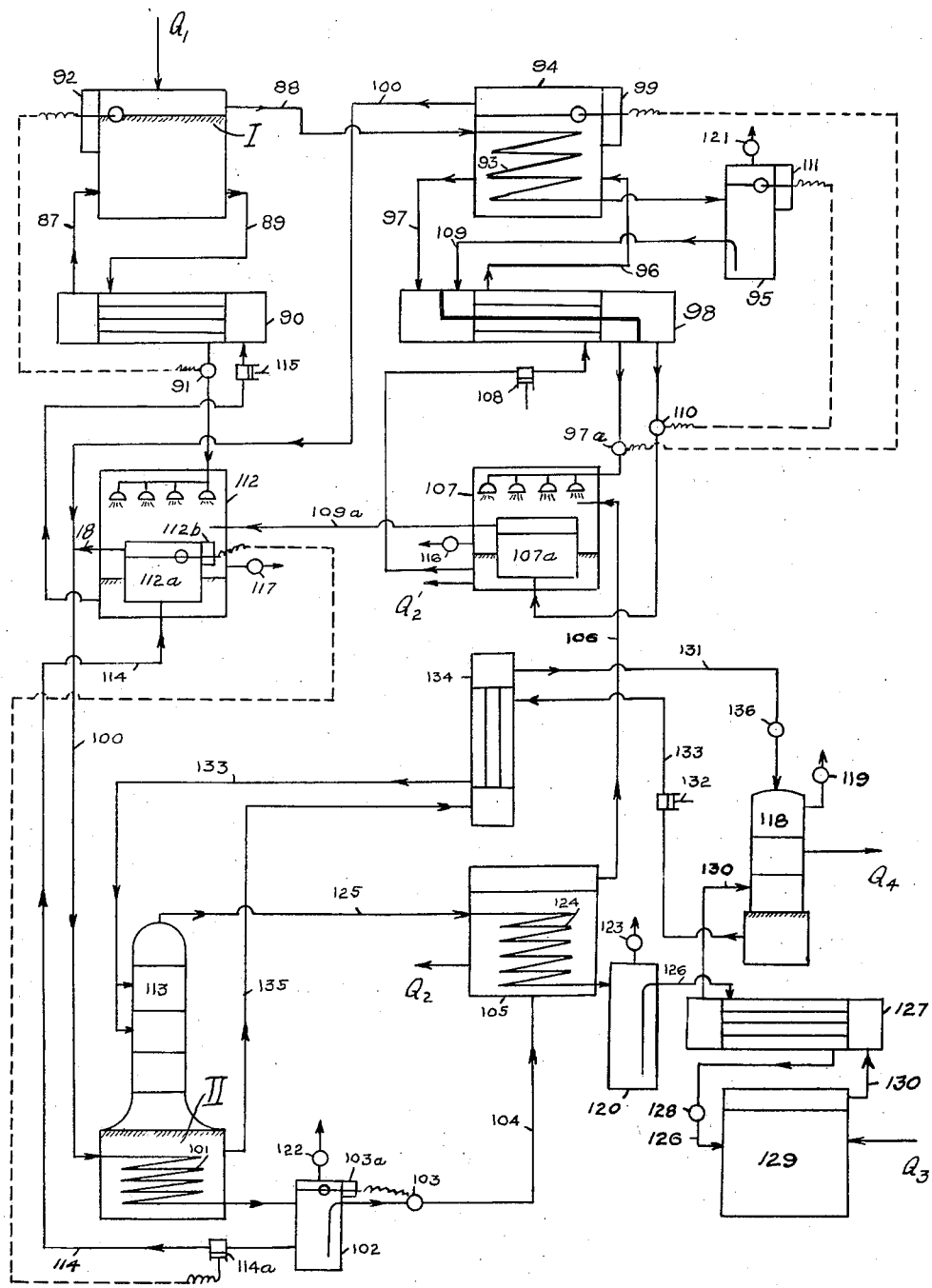
Figure 4 shows my duplex thermo-compression process wherein the concentration and dilution of the solution which operates through the higher temperature range are accomplished by double effect evaporation and double effect absorption respectively.

Under special conditions it may be desirable to store solute, solvent, and solution in tanks and to transport the working substances in tanks, trucks or other means than the pipe lines shown in Figure 4, as for example when the absorbing or working end of the cycle shown at the right hand side "Building" of Figure 4 is on board ship, in a submarine, moving or portable vessel, vehicle or at a distance and isolated from the concentrating or central station.

The details of operation of a central station system such as disclosed in Figure 2 by means of duplexing solutions may be modified in many ways and by the application of other cycles such as disclosed in the other figures in this application as well as that particular method of duplexing solutions disclosed in Figure 2. It is also clear that the pressure reducing means indicated in these various figures may consist of reducing valves or of fluid motors so as to utilize the pressure drop to aid in circulating the other fluids under pressure.

The use of duplexing solutions in heat or power cycles is not confined to simple thermal contact between the two solutions as has been described in Figures 1 and 2, but may be accomplished by other means, as by actual physical and chemical contact between the two solutions thereby utilizing directly the available energy in the solution without first resorting to a transformation of the available energy into the form of heat. Such methods of operation are shown diagrammatically in Figures 3 and 5.

Figure 3:
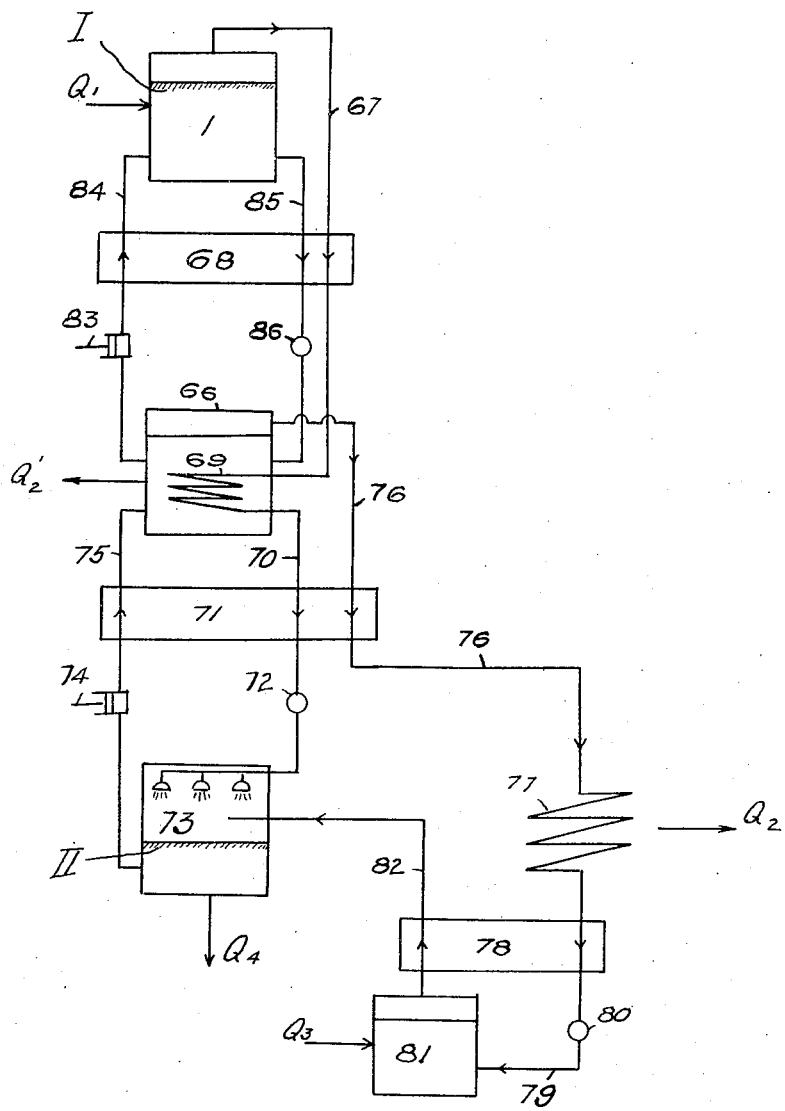
Figure 3 shows my duplex thermo-compression process as part of a refrigeration cycle using two miscible solutions having one component in common which is transferred from one solution to the other as they are mixed by the separation of the other component of a solution by a change in phase, such as from the liquid to the vapor phase.

Figure 3 indicates the modifications that might be made when the two liquid solutions I and II are completely miscible, the two phases in this case being vaporized solvent from solution II and dilute solution I which are formed in the extractor 66 from dilute solution II and concentrated solution I.

In Figure 3 solution I (such as an aqueous solution of caustic) is concentrated in concentrator 1 by the vaporization of solvent which flows through pipe line 67 through the countercurrent heat exchanger 68 thereby conserving the superheat in this solvent vapor then through coil 69 where the solvent vapor is condensed to liquid solvent, then through line 70 and the countercurrent heat exchanger 71 and the pressure reducing means 72 into absorber 73. In absorber 73 the liquefied solvent from solution I acts as a solute for the formation of solution II. Solution II so formed in absorber 73 is circulated by pump 74 through the countercurrent heat exchanger 71 and the pipe line 75 to extractor 66 wherein solution II comes into chemical contact with solution I. The solute of solution I has a greater affinity for the solute of solution II than the latter has for the solvent of solution II with the result that the solvent of solution II (such as ammonia) is vaporized from the solution in vessel 66 with the absorption of heat from the condensation of solvent I (such as water vapor) in 69. The vaporized solvent from solution II (such as ammonia vapor) leaves the extractor stripper 66 and is put to any useful purpose. As used for refrigeration as shown in Figure 3, this vapor flows through line 76 and the countercurrent heat exchanger 71 to condenser 77 where the vapor is condensed with rejection of heat $Q_2$ from which the liquefied solvent of solution II passes through the counter current heat exchanger 78 through pipe line 79 and the pressure reducing means 80 to the vaporizer 81, absorbing the heat quantity $Q_3$ therein. The vaporized solvent so formed passes through line 82, the countercurrent heat exchanger 78 into absorber 73 from which the heat of condensation and solution of solvent vapor of solution II (such as ammonia) in the liquefied solvent vapor of solution I (such as water) is given off as $Q_4$.

Dilute solution I (such as aqueous solution of caustic) is circulated by pump 83 through the countercurrent heat exchanger 68 in the pipe line 84 to the concentrator 1, thereby completing the cycle.

The heat $Q_2$ is rejected from the extractor stripper 66 in order to balance the operation of the simple process described in Figure 3.

In such an operation it is not essential that all of the solvent of solution II (such as ammonia) be completely stripped from the liquid solution I leaving the extractor stripper 66, as any such solvent carried into concentrator 1 will again be returned to absorber 73 through the vapor line 67, or to vessel 66 through line 85 and pressure reducing means 86.

Among the important advantages in duplexing solutions by means of actual chemical contact is the increased simplicity in the elimination of the heat transfer from an absorber to a concentrator as required in the process shown in Figure 1.

Figure 4 shows my duplex thermo-compression process using two solutions, solution I having a solvent appropriate for use at high temperature and solution II having a solvent appropriate for use at low temperature, in a more elaborate form than Figure 1. Dilute solution I introduced into the concentrator 1 through pipe 87 is concentrated therein by vaporizing solvent which is driven off from the solution I through the line 88 by the application of heat $Q_1$. The concentrated solution, i. e., solution containing a larger proportion of the solute than the solution entering through pipe 87, so formed leaves concentrator 1 through pipe 89 and the heat exchanger 90, its flow being controlled by valve 91 operated by the level control device 92 so as to maintain substantially constant liquid level in, and steady operation of, the concentrator 1.

The superheated solvent vapor flows through line 88, the closed heating coil 93 in the second stage concentrator or evaporator 94, and the condensate drains into surge tank 95. Dilute solution fed to evaporator 94 through pipe 96 is concentrated by vaporization of solvent effected by the heat of condensation of solvent in coil 93 in concentrator 94. Pressure is maintained so that the temperature of the boiling solution in concentrator 94 is low enough to cause condensation of the vapor in coil 93. The concentrated solution leaves concentrator 94 through pipe 97, countercurrent heat exchanger 98 and the flow or pressure controller 97a which may be operated by level control device 99. The "superheated" solvent vapor flows through line 100 into coil 101 where it is condensed and from which the condensate drains into surge tank 102. This condensate flows through valve 103, line 104, and is vaporized in heat exchanger 105 to form low pressure vapor supplied through line 106 to absorber 107 where it is absorbed by the concentrated solution supplied from concentrator 94 through pipe 97. This vapor is brought into intimate contact with the solution in absorber 107 by any convenient means such as through the use of spray nozzles. The absorption of this low pressure vapor in the concentrated solution in absorber 107 dilutes the concentrated solution and the dilute solution so formed is returned by solution pump 108 through the heat exchanger 98 and pipe 96 to the concentrator 94 where it is again concentrated.

Absorption of the low pressure vapors supplied through line 106 will take place in absorber 107 only if the heat given off by the condensation of these vapors and the dilution of the concentrated solution in absorber 107 is removed. This is accomplished by vaporizing the condensate from coil 93 which flows from surge tank 95 through line 109, the heat exchanger 98, the flow controller and pressure reducing means 110 which may be operated by the liquid level controller 111, into vaporizer 107a in thermal contact with the absorber 107. The condensed solvent in the vaporizer 107a is caused to boil under the reduced pressure by heat absorbed from the solution in absorber 107. Additional removal of heat from absorber 107 is indicated by $Q_2$ which may be rejected to cooling water or utilized in any desired manner.

The vapor generated in 107a by the heat absorbed therein is at a higher pressure than the vapor pressure of the solution in absorber 107 because the pure solvent has an appreciably higher vapor pressure than the solution at the same or even somewhat higher temperature. The vapor formed in vaporizer 107a is brought through line 109a into intimate contact with the solution contained in absorber 112 in a manner similar or equivalent to that used to bring the low pressure vapor in pipe 106 into intimate contact with the solution in absorber 107. The vapor pressure of the solvent in the solution in absorber 112 will be equal to or less than that of the vapor pressure of the solvent in vaporizer 107a. For this reason the vapors of solvent will be removed from vaporizer 107a and condensed and absorbed in the solution in absorber 112. The heat evolved in absorber 112 by the condensation of this vapor and by the dilution of the solution is given off at a higher temperature than exists in absorber 107, and is suitable for use in stripping solution II in stripper 113. As shown in Figure 4 this heat is absorbed from absorber 112 by vaporizing solvent of solution I in vaporizer 112a and delivered to stripper 113 by condensing this vapor in coil 101, the condensate being returned to vaporizer 112a through line 114.

The concentrated solution leaving concentrator 1 through pipe 89 flows through the counter-flow heat exchanger 90, the flow controller and pressure reducing means 91 operated by level controller 92 into absorber 112 where it absorbs vapor entering through line 109a. The dilute solution so formed is pumped through heat exchanger 90 by the pump or circulating means 115 and enters concentrator 1 by pipe 87.

Due to the fact that air or other fixed gases usually become mixed with the vapors in such a thermo-compression process, it is necessary to provide means by which the fixed gases are removed from the process in order to obtain continuous satisfactory operation. These vents may be located at any of a number of convenient places in the process and are shown in Figure 4 as located just above the level of the solutions in absorbers 107 and 112 for vents 116 and 117, near the top of absorber 118 for vent 119 and at the top of surge tanks 95, 102 and 120 for vents 121, 122 and 123. For such units that are operated under pressure greater than the atmosphere it is necessary simply to vent these lines to the atmosphere. But for units where the pressure may be below atmospheric it is necessary to supply a vacuum pump to keep the thermo-compression process free from fixed vapor.

The weight of solvent I flowing through pipe 100 and condensed in coil 101 is equal to the combined weights of the solvent vaporized in vaporizers 112a and 105. The condensate from coil 101 flows to surge tank 102 and in part goes to vaporizer 112a through line 114 and in part to vaporizer 105 through line 104 and pressure reducing means 103 where it is vaporized to supply the vapor for line 106. The heat necessary for this vaporization is supplied by the condensation in coil 124 of solvent II vapor received from line 125. More heat may be liberated by the condensation of this vapor than is required for the vaporization of solvent I for line 106 and any excess heat so generated may be rejected as heat $Q_2$ and taken away by cooling water or other means or put to any desired use.

Solution II which is used in a heating or refrigerating operation as shown in Figure 4 is concentrated or stripped of its more volatile component in stripper 113 by heat supplied to the stripper. The more volatile component (or solvent) passes off through line 125 and is condensed in coil 124, the condensate flowing into surge tank 120, from which it flows through line 126, the heat exchanger 127, pressure reducing and flow controlling means 128 into vaporizer 129, where it is vaporized under the low pressure by the absorption of heat $Q_3$ at a low temperature. The solvent vapor so formed passes through line 130, the heat exchanger 127 into absorber 118 where it is absorbed in the solute, or solution lean in solvent, supplied through line 131 with the evolution of heat $Q_4$ which is rejected to the surroundings and used for heating purposes or absorbed in cooling water or the atmosphere. The solution so formed in the absorber 118 is pumped by pump 132 through line 133, the heat exchanger 134 to the stripper 113 where it is stripped of its more volatile component as described. The stripped solute or solution lean in solvent flows from the bottom of the stripper 113 through line 135, the counter-flow heat exchanger 134, line 131 and the flow controller 136.

Other means of control of the operations than those described may be used as desired, and other arrangements may make it unnecessary to reject heat $Q_2'$ from absorber 107 in addition to heat $Q_2$ as rejected from condenser vaporizer 105. As suggested under the discussion of Figure 2 it may be possible to reject all heat at one place as $Q_4$ by proper arrangement of the various parts and flow of solutions.

An example of the operating conditions and results obtained by use of my duplex thermo compression process is given for the cycle as described and shown in Figure 4. It should be clearly understood that the temperatures, pressures and concentrations used in this example are not those that must be used in the use of my process but are used simply for the purpose of explaining how the operation may be conducted under certain conditions. The process is applicable to a wide range in temperatures, pressures and concentrations depending upon the operations that are to be carried out.

In this example a 60% solution I, composed of 60% by weight of caustic soda in water is maintained in concentrators 1 and 94, with 55% solution I in absorbers 107 and 112. Solution II, composed of ammonia and water, is about 39% by weight of ammonia in water in the bottom of stripper 113 and about 42% ammonia in absorber 118, when operated so as to produce a refrigeration effect ($Q_3$) at about 23° F. with rejection of heat ($Q_4$), at a higher temperature of about 100° F. to cooling water or air. Under these conditions the temperature of the boiling solution in concentrator 94 operating under a pressure of about 19 lbs. per sq. in. abs. is about 340° F. and the steam leaving concentrator 94 through line 100 is "superheated steam". The steam from concentrator 1 is under a pressure of about 150 lbs. per sq. in. abs. and condenses at a temperature of about 360° F. in coil 93. The boiling point of the 60° solution I in concentrator 1 under this pressure of about 150 lbs. per sq. in. is about 500° F.

The boiling point of solution I in vessel 107 is about 183° F. and the actual operating temperature somewhat below this, so that the temperature of the steam leaving vaporizer 107a is about 160° F. and at a pressure of about 4.7 lbs. per sq. in. as it enters absorber 112. The boiling point of the solution in absorber 112 under this pressure is in the neighborhood of 250° F. and the temperature of steam leaving vaporizer 112a is about 225° F. at a pressure of about 19 lbs. per sq. in. This steam is combined with the steam in line 100 at the same pressure and condensed in coil 101 giving up its heat of condensation (and superheat) to solution II in stripper 113.

Solution II in stripper 113 is at a temperature of about 212° F. and under a pressure of about 18 atmospheres absolute, corresponding to the boiling point of a 39% ammonia solution at this temperature. The vapor leaving stripper 113 is about in equilibrium with the incoming 42% solution and has a composition of about 97% ammonia. This vapor is condensed and subsequently vaporized in vessel 129 by the intake of heat $Q_3$ at about 23° F. producing the refrigeration effect.

Under these conditions of operation about 1800 B. t. u. supplied to the boiling solution in concentrator 1 produces about 1200 B. t. u. refrigeration corresponding to a coefficient of performance of $$C. P. = \frac{Q_3}{Q_1} = \frac{1200}{1800} = 0.67$$

If this refrigeration effect of 1200 B. t. u. is produced by an ammonia-water absorption refrigeration cycle, such as is shown in Figure 4 for solution II, receiving operating heat at 212° F. to vessel 113, about 2635 B. t. u. are required instead of 1800 B. t. u. by the method of operating my invention shown in Figure 4 which results in an increase of about 50% in the coefficient of performance of such an ammonia absorption cycle, as the C P is raised from 0.45 to 0.67.

The ratio of heat delivered, by the condensation of solvent I, to solution II to that supplied to concentrator I is about 1.5 or 150% which is a measure of the performance of the duplexed cycle illustrated in Figure 4 referred to that of an ammonia-water cycle operated alone.

If, for example, we take an ammonia-water cycle of conventional design operated at 212° F., 68° F., and 14° F. its coefficient of performance is 0.64 which can be increased to about unity by duplexing with a high temperature process as indicated by Figure 4. An ammonia cycle alone could not give a coefficient of performance of unity nor could the caustic cycle be operated without freezing at 14° F.

Figure 5:
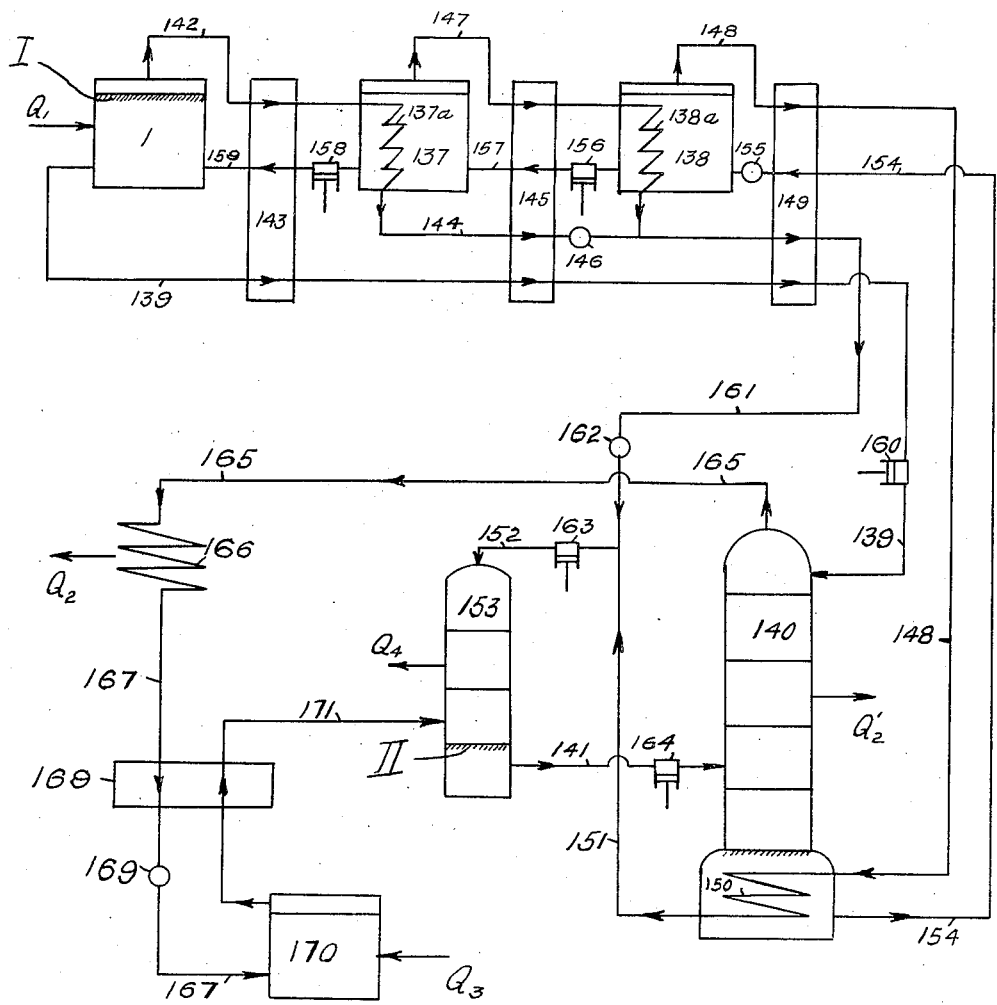
Figure 5 shows my duplex thermo-compression process using triple effect concentration for the solution which operates at the upper temperature level.

Figure 5 is a diagram showing a similar but more elaborate duplexed cycle than is illustrated in Figure 3 previously described. Figure 5 incorporates three concentration effects 1, 137 and 138, for solution I, in place of one concentrating effect for solution I as shown in the drawing of Figure 3. As an example of the operation of this process, the high temperature solution I may be a solution of sodium hydroxide and water, with water as solvent I; and solution II, the low temperature solution may be ammonia and water with ammonia as solvent II. In most cases when an ammonia-water solution is boiled the vapor given off by the solution is composed principally of ammonia vapor with a small proportion of water vapor, the latter component depending in amount on the temperature at which vaporization occurs and upon the relative proportions of ammonia and water in the liquid solution. Solvent II vapor, however, in the case of Figure 5 is almost pure ammonia as the caustic solution I supplied through line 139 to extractor 140 absorbs or extracts practically all of the water from the solution II entering extractor 140 through line 141.

In the operation of the process about 1440 B. t. u. per hour are added as heat $Q_1$ to the first concentrator (I) which contains sodium hydroxide solution (I) of 60% concentration and at a pressure of about 150 lbs. per sq. in. and temperature of about 500° F. Under these conditions steam leaves concentrator I through pipe 142 giving up its superheat in passing through heat exchanger 143 and enters coil 137a at about 360° F. which is the saturation temperature of steam at this pressure. The solution in concentrator 137 is 59.0% caustic soda (NaOH) and is under a pressure of about 19 lbs. per sq. in. at which pressure it boils at 333° F. This temperature is sufficiently low to cause the steam in coil 137a to condense giving up its heat of condensation to the solution in 137 and leaving the coil in the form of condensate through line 144, heat exchanger 145 and pressure reducing means 146.

Due to the heat added from coil 137a water is vaporized from the solution in evaporator 137 and leaves as superheated steam through pipe 147, gives up its superheat in heat exchanger 145 and is condensed at its saturation temperature of about 225° F. in coil 138a. Concentrator 138 contains about 56.5% solution at a pressure of about 1.6 lbs. per sq. in. at which it boils at about 205° F. This temperature is sufficiently low so that the heat of condensation of the steam in coil 138a is absorbed by the solution, causing it to boil and give off superheated steam which passes through line 148 and heat exchanger 149 where it gives up its superheat and enters coil 150 where it condenses and leaves through lines 151 and 152 to absorber 153.

Dilute solution I at about 55.5% enters concentrator 138 from the bottom of 140 through line 154, heat exchanger 149 and pressure reducing means 155. Solution I concentrated to about 56.5% in concentrator 138, is pumped by 156, through heat exchanger 145 and line 157 to concentrator 137 where it is concentrated to 58% and pumped to concentrator I through pump 158, heat exchanger 143 and line 159. It is concentrated further in concentrator I to 60% and flows through line 139, heat exchangers 143, 145 and 149 and pumped by 160 through line 139 to the ammonia stripper or extractor 140.

Condensate from coil 138a enters the stream in line 161 and the combined stream flows through line 161, heat exchanger 149 and pressure reducing means 162, when it joins the stream from line 151 and the combined stream of condensate (solvent I) passes through pump 163 and line 152 to absorber 153.

In extractor 140 operating at about 213 lbs. per sq. in. solution I entering through line 139 with a concentration of 60% caustic, extracts the water from solution II and leaves at about 55% caustic concentration through line 154. Solution II at about 40% ammonia (NH3) concentration entering through line 141 and pump 164 from the absorber 153 gives up its water content to solution I in extractor 140, and the resulting practically pure ammonia vapor, leaves through line 165 going to the condenser 166 where it is condensed with the rejection of heat $Q_2$ at about 105° F. to the cooling water or atmosphere. The temperature in extractor 140 is also about 105° F. which is sufficiently below the temperature of 119° F. of the condensing steam in coil 150 to allow this heat of condensation to pass to the solution in 140 supplying the heat of vaporization of the ammonia. As all of this heat of condensation from coil 150 is not needed for the reaction in the stripper 140, heat $Q_2'$ is rejected from the process.

Condensate (ammonia) leaves condenser 166 through line 167, heat exchanger 168 and pressure reducing means 169 and enters vaporizer 170, where it is vaporized under a pressure of about 50 lbs. per sq. in. and at a temperature of 22° F. by the intake of about 770 B. t. u. per hour shown in the figure as heat $Q_3$. Saturated ammonia vapor leaves vaporizer 170 and passes through heat exchanger 168, where it is superheated to about 80° F., and passes through line 171 to absorber 153, where it is absorbed in the water entering through line 152 to form ammonia solution of about 40% ammonia which leaves vessel 153 through line 141.

Under these conditions of operation the temperature of the absorber may rise to above 200° F. in the upper part where the water first comes into contact with the ammonia vapor. In order to absorb the ammonia to form a 40% solution under the operating pressure of 50 lbs. per sq. in. it is necessary to cool the solution to about 100° F. in the lower part of absorber 153. The heat quantity, $Q_4$, is therefore rejected from the absorber to a cooling medium somewhat below 100° F. The coefficient of performance obtained with the use of my duplex thermo compression process in an ammonia refrigerating cycle as shown in Figure 5 and operating under the conditions outlined, is about 0.53. This value is obtained by dividing the refrigerating effect, $Q_3$ by the heat energy supplied, $Q_1$, at the high temperature.

$$\frac{770}{1440} = 0.53$$

The coefficient of performance of this refrigerating cycle using my thermo compression process, as shown in Figure 5 may be readily improved by rather simple changes in the process. As has been indicated part of the heat, $Q_4$, rejected by the absorber 153 is available at temperatures of about 200° F., and can therefore be used within the process.

It is clear that other changes in the flow of solutions may be made which will still further increase the efficiencies of the process, and that other solutions may be used than those which have been mentioned in these examples.

In the numerical examples just cited the two solutions, used by way of illustration, aqueous solutions of caustic and ammonia, are those most commonly employed in solution cycles. Many other solutions are suitable as their thermodynamic and physical properties conform to the requirements of the process to which the particular solution cycle (either with or without duplexing or the improvements described in applications No. 725,760 and No. 335,512), is to be applied.

The working range of a heat cycle is limited, not only by the properties of the working substance but also by those of the materials used in construction of the equipment. In the application of solutions to heat cycles, solutions of caustic potash, caustic soda, calcium chloride, and sulfuric acid have received consideration mainly because of their favorable thermodynamic properties, but practical operations using such materials clearly indicate their disadvantages in the requirement of expensive and special materials of construction.

The use of solutions of ammonia and water is widespread in the refrigeration industry, and such solutions can be used economically and satisfactorily because of their non-corrosive properties making it possible to construct the apparatus of steel or iron.

The use of ammonia-water solutions could be widely extended into other fields such as domestic air-conditioning if it were not for the noxious qualities of ammonia vapor which might escape from the apparatus. A further limitation to the use of ammonia-water solutions is the high pressure necessary to keep the ammonia in solution if the solution is to be used above 200° F., which temperature is too low for efficient operation.

Although it is possible to employ solutions with a moderately high elevation in boiling point in an efficient manner by the use of my thermo-compression process as described in applications Nos. 725,760 and 335,512, and as the low temperature solution in a duplexing cycle, it is desirable that the boiling point of the solution has a high elevation above that of the pure solvent. A convenient way of expressing this elevation in boiling point is by a ratio of the absolute temperature of the boiling point of the solution to the absolute temperature of the boiling point of the pure solvent at the same pressure $$\left(\frac{T_{solution}}{T_{solvent}}\right)$$

Solutions which have a value for this ratio which increases with pressure are used with greater efficiency in the heat cycle primarily because the heat supplied to the working substance is at a higher temperature than would otherwise be the case.

For efficient operation of heat cycles it is imperative that the heat be rejected from the cycle at the lowest available temperature, and in cycles used for refrigeration and air-conditioning it is necessary that the solution used as a working substance has satisfactory properties at temperatures in the vicinity of that of the atmosphere.

For these reasons low freezing points are generally desirable and frequently essential in a solution to be used in a heat cycle.

For some operations high elevation in boiling point may be the most important characteristic desired of the solution, and solutions such as caustic soda and caustic potash may prove entirely satisfactory in spite of the relatively high freezing point and the difficulty of handling these solutions due to danger from caustic embrittlement if steel is used as a material of construction. Under other conditions of operation other properties become relatively more important and solutions of other characteristics are essential for the satisfactory operation of solution heat cycles.

An important field for the application of such cycles is in refrigerating, air-conditioning, and cooling in which the temperature limits of the cycle may vary from about 40° F. to 100° F. for the air-conditioning or cooling process, and from about 200° or 300° F. to about 100° F. depending upon the cycle for the thermo-compression part of the cycle. Solutions for use over this temperature range should have a high elevation in boiling point, a relatively low freezing point (well below the lower temperature limit of the thermo compression process), be non-corrosive, non-toxic, emit no noxious fumes or odors and possess a low viscosity or high fluidity for efficient heat transfer at the temperature at which they are to be used.

I have found that solutions of glycerin and water possess most of these desired qualities over this temperature range. For a given freezing point of the solution, it is possible to obtain an equivalent elevation in boiling point by the use of glycerol as a solute with water as the solvent, as when using caustic soda. Furthermore the glycerin-water solution is non-corrosive, non-toxic, can be prepared at low cost and used with ordinary materials of construction. When compared with other solutes such as calcium chloride, the glycerin-water solution shows up even more favorably in regard to the elevation in boiling point for a given freezing point.

The viscosity of glycerol-water solutions containing high percentages of glycerol is, however, high. By the addition of certain salts, such as ammonium iodide, the viscosity of the glycerin may be reduced. Other additives, such, for example, as glycol, improve the viscosity without detrimental effect on the boiling point.

The addition of salt to glycerin-water solution may also be used to raise the boiling point of the solution thereby increasing the elevation in boiling point. It is possible by the use of rather concentrated solutions of sodium-chloride and glycerol with water to obtain elevations in boiling point considerably in excess of those obtained by the use of 60% caustic soda in aqueous solution. When it is considered that the glycerol solution does not cause caustic embrittlement of steel, is non-corrosive, and non-toxic, the practical advantages in its use as compared with the difficulties in using caustic solutions may be readily appreciated.

Non-corrosive properties are extremely important in the practical application of chemical solutions to heat cycles. If the solution is corrosive expensive equipment constructed of special material is required for the handling of the solution. It is frequently more economical to use an expensive solution provided that it has non-corrosive properties as the saving in the cost of the materials of construction will more than compensate for the additional expense of the solution.

In general the most stable and least corrosive inorganic compounds are those composed of a strong alkali metal combined with the negative radical of a strong acid. The alkali metal halides such as lithium chloride, lithium bromide, sodium chloride or potassium fluoride which are formed by the combination of the alkali metals of the first group of the periodic system with the halides of the seventh group are stable neutral salts of a generally non-corrosive nature. Many of the alkali metal halides also form aqueous solutions having relatively high elevations in boiling points with moderately low freezing points. Because they meet the thermodynamic requirements and in addition do not cause caustic embrittlement, are stable and relatively non-corrosive, the solutions of the alkali metal halides are most suitable aqueous solutions for use in solution heat cycles, or in my thermo compression process wherever non-corrosive properties are desired.

Compounds formed from the alkali metals and the strong acids such as nitric and sulfuric acids, are also stable compounds and offer advantages in some cases.

Similar ammonium salts such as ammonium iodide should also be considered in this group as the ammonium radical has much the same chemical properties as the alkali metal radicals. The ammonium salts are not so stable at the high temperatures as those of the alkali metals, as they tend to give off ammonia vapor. But for a great many uses where the temperature is not high enough to cause troublesome decomposition, the salts of ammonium combined with the strong acids, particularly the ammonium halides, form advantageous aqueous solutions for use in solution heat cycles and my thermo compression process.

Aqueous solutions of glycerin and of the related compounds, glycols, are absolutely non-toxic, harmless when brought into contact with the skin and non-corrosive when used in solution heat cycles or in my thermo compression process, and when possessing the desired thermodynamic properties constitute very desirable working fluids.

Combinations of the alkali metal salts, particularly the halides, with aqueous solutions of glycerin or of the glycols frequently possess most desirable properties for particular operations if the maximum temperature to which the solution is subjected is not so high as to cause troublesome decomposition of the organic compounds.

The use of lead perchlorate as a solute dissolved in some solvents, such as water for example, will give a relatively high elevation in boiling point and is therefore desirable for use in some cases.

For operations where the minimum temperature of the cycle is extremely low, as for example in the manufacture of "dry ice" or the production of liquid air, the duplexing of a solution capable of absorbing heat at a high temperature for the efficient operation of the process, such as an aqueous solution of lithium salts, with another solution in which one component has a very low vaporizing temperature, such as a solution of glycerol and carbon dioxide, may be usefully employed.

For operations where the maximum temperature of a cycle is extremely high and the use of mercury as a solvent may be justified in spite of its toxic properties amalgams of mercury with other metals such as thallium, zinc, tin and bismuth offer the use of mercury solutions in solution heat cycles or in my thermo compression process, as such solutions or amalgams offer an elevation in boiling point for the mercury solution over that of pure mercury in a manner similar to that in which the use of the salts described above increases the boiling point of the aqueous solution over that of the pure water.

By "dissimilar solutions" as used in the claims is meant two solutions in which at least one component (solvent or solute) is different in the two solutions.

I claim:

1. A continuous solution cycle heat transfer process which includes the following steps, the vaporization of a volatile component from a solution, the subsequent condensation of such vapor, the absorption of the heat effect accompanying such condensation by a second similar solution, the vaporization thereby of a volatile component from said second solution at a lower temperature than that at which the volatile component was originally vaporized from the first solution, successive repetitions of this step with the absorption of the heat effect accompanying the last condensation by a dissimilar solution and the vaporization thereby of a volatile component from said dissimilar solution at a lower temperature than that at which the first volatile component was vaporized and the subsequent utilization of the vapor so formed from the dissimilar solution, said dissimilar solution having a different elevation in boiling point temperature than the first solution when the two solutions are in thermal contact, said two solutions being of different chemical composition.

2. A continuous solution cycle heat transfer process which includes the following steps, the vaporization of a volatile liquid, the subsequent condensation of the vapor so formed into a solution that has a vapor pressure lower than that of the volatile liquid at the same temperature, use of the heat effect accompanying such condensation and solution to heat and vaporize a volatile liquid, subsequent condensation of the vapor so formed into a similar solution, and repetition of such steps, with absorption of the heat effect of the last condensation by a second dissimilar solution and the use of this heat effect to vaporize volatile component from the second solution, said dissimilar solution having a different elevation in boiling point temperature than the first solution when the two solutions are in thermal contact, said two solutions being of different chemical composition.

3. A continuous solution cycle heat transfer process which includes the following steps, the use of two solutions with a common volatile component which are completely miscible when in the liquid form, the concentration of the first solution by vaporization of a common volatile component by the application of heat at a high temperature, the intimate contacting of this concentrated first solution with the second solution for the purpose of increasing the vapor pressure of a second volatile component, and the vaporization of the second volatile component from the mixed solution by heat absorbed from condensing the first volatile component which was vaporized from the first solution by the application of heat.

4. A continuous solution cycle heat transfer process which includes the following steps, the use of two solutions which are miscible in the liquid phase, the concentration of solution I by the application of heat at high temperature to vaporize volatile component I, counter-current heat exchange between the superheated vapor I leaving the concentrator, the concentrated solution I leaving the concentrator and the dilute solution I flowing to the concentrator, the condensation of vapor I to liquid, the use of this heat of condensation to vaporize volatile component II from the mixed solutions, the counter-current heat exchange between condensed volatile component I leaving the mixed solution stripper and dilute solution II flowing to the mixed solution stripper, supplying liquid component I from the condensing coil in the mixed solution stripper to an absorber, the absorption of low pressure vapor II in liquefied volatile component I with the rejection of low temperature heat from the process, supplying the second solution composed of liquefied volatile components I and II to the mixed solution stripper and supplying concentrated solution I to the mixed solution stripper and dilute solution I from the mixed solution vaporizer to the concentrator.

5. A continuous solution cycle heat transfer process which includes the following steps, the use of two solutions which are miscible in the liquid phase, the concentration of solution I by the application of heat at high temperature to vaporize volatile component I, counter current heat exchange between the superheated vapor I leaving the concentrator, the concentrated solution I leaving the concentrator and the dilute solution I flowing to the concentrator, the condensation of vapor I to liquid, the use of this heat of condensation to strip volatile component II from the mixed solutions, the counter current heat exchange between superheated vapor II stripped from the mixed solution, condensed volatile component I leaving the mixed solution vaporizer and dilute solution II flowing to the mixed solution vaporizer, the condensation of vapor II with the evolution of heat which may be rejected from the cycle, the flow of such liquid component II through a pressure reducing means to a vaporizer where low temperature heat is absorbed by the cycle and used to vaporize liquid component II, absorption of the vapor II so formed in liquefied component I with the evolution of heat at a higher temperature.

6. A continuous solution cycle heat transfer process which includes the following steps, the absorption of low pressure vapors supplied to the process with the evolution of heat which is rejected from the process, passing the solution so formed through a counter current heat exchanger to a concentrator or stripper operating at a higher pressure which is heated by the condensation of a vapor supplied under high pressure from a second thermo compression process, supplying the vapors so stripped or vaporized from the solution at a high pressure for use in some device or operation, and returning the absorbent or stripped solution through the counter current heat exchanger to the absorber for reabsorbing low pressure vapors.

7. A continuous solution cycle heat transfer process which includes the following steps, the vaporization of a volatile component from a solution, the subsequent condensation of such volatile component to liquid, the subsequent reduction of the pressure on this component and the subsequent absorption of this component in solution circulated from the region where the first vaporization step took place, said condensation and absorption taking place in the same region, utilizing the heat driven off in the condensation and absorption steps to generate a fluid from a solution in the said same region, said fluid being chemically different from the components of the first mentioned solution, subsequently condensing said fluid, subsequently evaporating said fluid, subsequently bringing it into heat exchange relation with the first component at the point where said first component is at reduced pressure and returning it to the solution at the point where it was generated.

8. In a continuous solution cycle heat transfer process using two different solutions containing a common component the steps which include bringing the two solutions into intimate contact in an extractor whereby the common component is extracted from the first solution by the second solution with the vaporization of the other component of said first solution, and subsequently condensing said other component at a higher pressure than that corresponding to its vapor pressure at the lowest temperature of the cycle.

9. A continuous solution cycle heat transfer process using two solutions which are completely miscible and which have a common component which includes the following steps, bringing the first of said solutions in concentrated form into intimate mixture with the second of said solutions and adding heat to said mixture derived from the condensation of the vapor of the common component of said solutions whereby vaporization of a component of the second of said solutions from the mixed solutions is effected.

10. A continuous solution cycle heat transfer process which includes the following steps, the vaporization of a volatile component from a first solution, subsequent condensation of said vaporized volatile component, absorption of the heat of said condensation by another solution containing a second volatile component not present in said first solution, vaporization of said second volatile component from said other solution, condensation of said second volatile component vaporized from said other solution, revaporization thereof, and the subsequent return of both said volatile components to their respective solutions.

11. A continuous solution cycle heat transfer process which includes the following steps, the vaporization of a volatile component from a first solution, subsequent condensation of said vaporized volatile component and absorption of the heat of said condensation by another solution, said other solution being a mixture of said first solution with a second solution containing a second volatile component not present in said first solution, vaporization of said second volatile component from said other solution, condensation of said second volatile component vaporized from said other solution, revaporization thereof, and subsequent absorption thereof in said condensed first volatile component to produce said second solution, and combining said first and second solutions.

WILLIAM H. SELLEW.